United States Patent
Obrecht (10) Patent No.: US 9,512,820 B2
(45) Date of Patent: Dec. 6, 2016

(54) METHOD AND SYSTEM FOR IMPROVING WIND FARM POWER PRODUCTION EFFICIENCY

(71) Applicant: John M. Obrecht, Louisville, CO (US)

(72) Inventor: John M. Obrecht, Louisville, CO (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 700 days.

(21) Appl. No.: 13/770,125

(22) Filed: Feb. 19, 2013

(65) Prior Publication Data

US 2014/0234103 A1 Aug. 21, 2014

(51) Int. Cl.
*F03D 7/02* (2006.01)
*F03D 7/04* (2006.01)

(52) U.S. Cl.
CPC .............. *F03D 7/0204* (2013.01); *F03D 7/048* (2013.01); *F05B 2270/20* (2013.01); *F05B 2270/321* (2013.01); *F05B 2270/329* (2013.01); *Y02E 10/723* (2013.01)

(58) Field of Classification Search
None
See application file for complete search history.

(56) References Cited

U.S. PATENT DOCUMENTS

| | | | |
|---|---|---|---|
| 7,299,627 B2 | 11/2007 | Corten | |
| 8,332,077 B2 * | 12/2012 | Kondo | F03D 7/047 290/44 |
| 2009/0099702 A1* | 4/2009 | Vyas | F03D 7/0292 700/287 |
| 2013/0103202 A1* | 4/2013 | Bowyer | F03D 7/0292 700/275 |

OTHER PUBLICATIONS

"The application of PIV to the wake of a wind turbine in yaw"; Parkin, Holm, Medici; 2001.*
Christina Tsalicoglou, "Numerical Study of Wind Turbine Wake Aerodynamics in Uniform and Yawed Inflow", Apr. 2012.*
Medici, David, Wind Turbine Wakes—Control and Vortex Shedding, Technical Reports from KTH Mechanics, Mar. 2004, pp. 1-95, Royal Institute of Technology, Stockholm, Sweden.

* cited by examiner

Primary Examiner — Igor Kershteyn
Assistant Examiner — Justin Seabe (57) ABSTRACT

A method and system for improving power production efficiency on a wind farm having of a plurality of spatially distributed wind turbines is provided. The method includes receiving a wind measurement that includes a wind direction impinging on a turbine (20), determining a misalignment of the wind turbine with respect to the wind direction, and activating a wake steering control for the wind turbine (20) to implement the misalignment of the wind turbine (20) with the wind direction such that the misalignment is adapted to steer a wake of the wind turbine away from a neighboring wind turbine (30). A wind turbine arrangement including a nacelle, a yaw controller, and a yaw drive is also provided.

16 Claims, 8 Drawing Sheets

METHOD AND SYSTEM FOR IMPROVING WIND FARM POWER PRODUCTION EFFICIENCY

FIELD OF THE INVENTION

The invention relates to a method and system for improving power production efficiency of a wind farm.

BACKGROUND OF THE INVENTION

Wind power can be generated via a wind-farm wherein wind turbines convert the power in the wind to electricity. Wind farms are created when multiple wind turbines are placed in the same geographic area for the purpose of generating large amounts of electrical power. The power output of each wind turbine varies with wind speed and can be influenced by the wake of an upstream turbine, thus affecting the overall power production of the wind farm.

Figure 1:
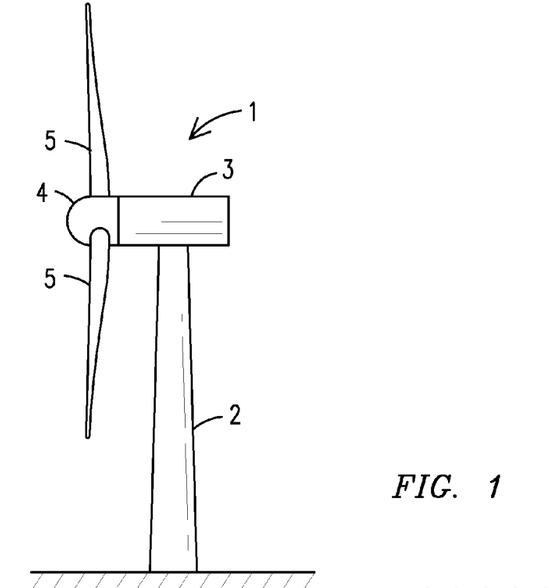
FIG. 1 is a schematic drawing depicting a typical assembled wind turbine.

In a conventional manner, as shown in FIG. 1, an assembled wind turbine 1 includes a tower 2, a nacelle 3 and a rotor including a hub 4 with rotor blades 5. The nacelle 3 is rotatably mounted on the tower 2 around a yawing axle (not shown). A yaw control motor (not shown) is located between the tower 2 and the nacelle 3 to yaw the nacelle based on wind direction. The wind direction is typically measured by use of a wind vane or by use of a sonic wind sensor (not shown). To achieve optimum conversion of wind power into electrical power the rotor axis is aligned with the wind direction.

Figure 2:
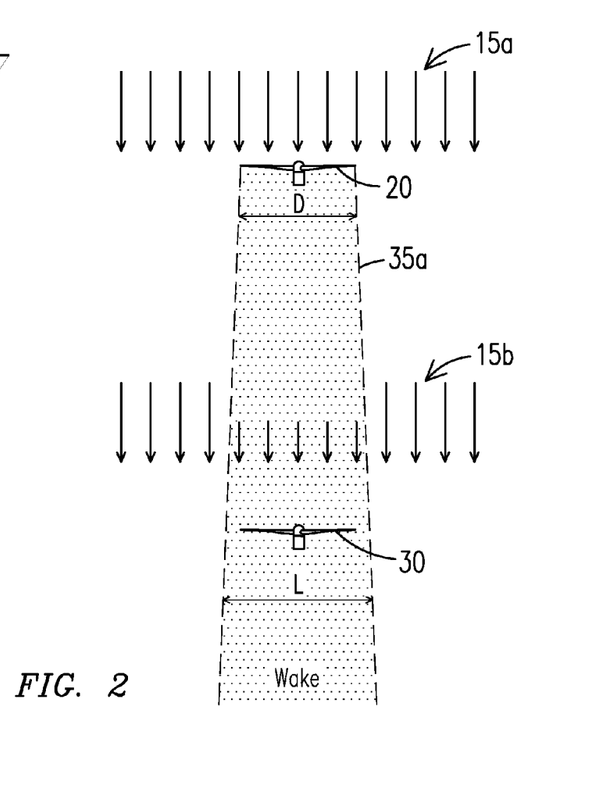
FIG. 2 is a schematic drawing depicting the wake influence of an upstream turbine on a downstream turbine.

Wind turbines located downstream from other wind turbines are influenced by the wake of the upstream turbine. As shown in FIG. 2, based on the incoming wind 15a the forward turbine 20 casts a wake 35a onto the downstream turbine 30 thereby influencing the wind 15b impinging on the downstream turbine. As a result, there is less energy in the wind 15b for the downstream turbine 30 to extract, making it less productive, relative to the upstream turbine 20. For small changes in wind direction, there is a functional form to the power production of the downstream turbine 30. It produces the least amount of power when the wind 15a is aligned perfectly with the oriented direction between the turbines 20, 30, and produces more power as the wind direction changes either left or right. The Jensen theory of wake expansion is shown, where wind turbine wakes 35a are known to expand slightly (approximately a 10 degree angle).

In view of the negative influence caused by the wakes of upstream turbines, there is a need in the art for a system and method to increase the power production efficiency of the wind farm by narrowing the influence of such wakes.

BRIEF DESCRIPTION OF THE DRAWINGS

The invention is explained in the following description in view of the drawings that show.

DETAILED DESCRIPTION OF THE INVENTION

A method and system for improving power production efficiency of a wind farm is provided. The method includes receiving a wind measurement that includes a wind direction impinging on a turbine, determining a misalignment of the wind turbine with respect to the wind direction, and activating a wake steering control for the wind turbine to implement the misalignment of the wind turbine with the wind direction such that the misalignment is adapted to steer a wake of the wind turbine away from a neighboring wind turbine. A wind turbine arrangement including a nacelle, a yaw controller, and a yaw drive is also provided.

The invention can be implemented in numerous ways, including as a system, a wind turbine arrangement, a device/apparatus, a computer-implemented method, or a non-transitory computer readable medium containing instructions to implement the method. As a system, an embodiment of the invention includes a memory, input/output devices, a processor unit, and an optional display device and/or database.

The method and system uses a wake steering control scheme to systematically yaw a turbine's orientation relative to incoming wind flow so as to direct the wake cast by an upstream turbine away from neighboring (e.g., downstream) turbines, thus allowing them to produce more power from the wind. In this manner, the method and system operates on in a wind farm to direct the wake created by their operation away from neighbors within the farm as well as narrow the influence of their wakes geometrically. Done systematically, this will increase the overall power production of the wind farm.

Figure 3:
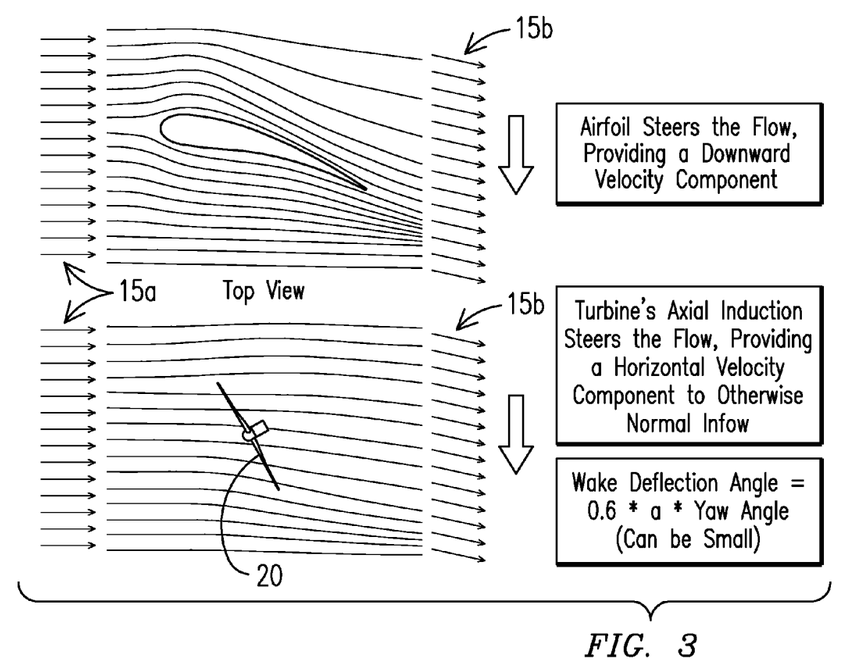
FIG. 3 is a diagram illustrating directed flow.

FIG. 3 illustrates the concept of directed flow. Similar to an airfoil of a plane (or wind turbine) that generates lift by directing flow downwards, a wind turbine 20 steers the flow of wind 15b passing through it, if that wind turbine 20 is angled to be misaligned with the incoming wind 15a. The amount by which the turbine 20 can steer the flow is limited by the amount of slowing it does on the wind (known as axial induction).

Actuator disc theory predicts that the wake of a turbine 20 will be directed by an amount proportional to (a) the axial induction that the turbines induces on the wind (axial induction a), and (b) the angular misalignment of the turbine (yaw angle $\theta$). The resulting angular deflection of the turbine's wake (wake deflection angle $\phi$) can then be approximated as $\phi=0.6a\theta$. During the variable speed operation, the axial induction a is approximately 1/3, and the amount of steering that can be accomplished by the turbine is approximately a 1:5 amount relative to the turbine's angular misalignment (0.6*1/3=1/5).

Figure 4:
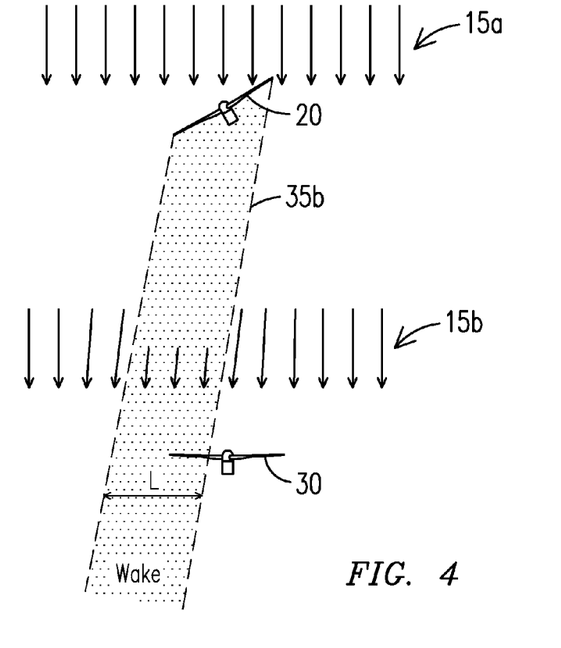
FIG. 4 is a schematic drawing depicting the narrowed wake influence of a misaligned upstream turbine on a downstream turbine.

Referring back to FIG. 2, a forward turbine 20 casts a wake 35a onto the downstream turbine 30. As a result, there is less energy in the wind 15b for the downstream turbine 30 to extract, making it less productive, relative to the upstream turbine 20. Turning now to FIG. 4, a turbine 20 that is misaligned with the incoming wind 15a according to the invention will deflect its wake 35b from the downstream turbine 30, thus allowing it to make considerably more power from the wind 15b impinging on the downstream turbine 30 than if the upstream turbine 20 had undergone no wake steering.

Figure 5:
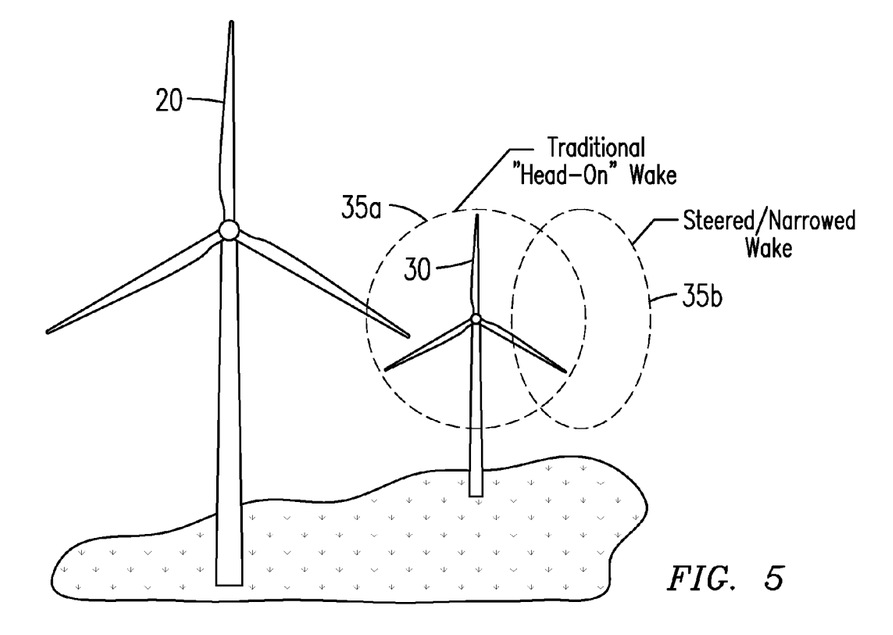
FIG. 5 is a drawing depicting the wake influences of an upstream turbine on a downstream turbine, with and without steering.
Figure 6A:
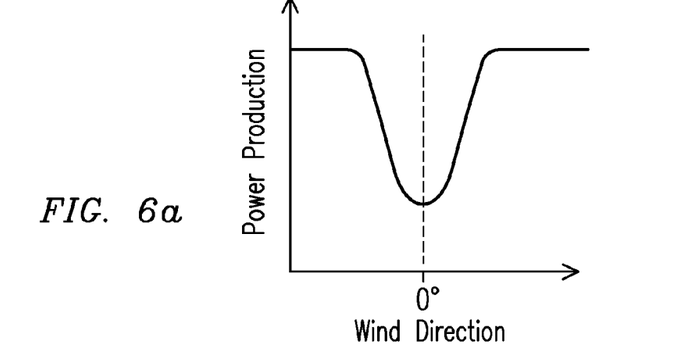
FIGS. 6a-6b illustrate power production graphs for turbines without steering and with steering.
Figure 6B:
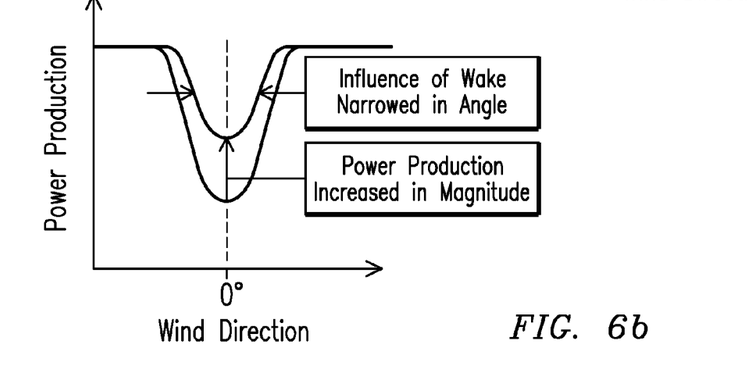

The steered narrowed wake 35b as compared to a traditional head on wake 35a for an upstream turbine 20 and downstream turbine 30 is illustrated in FIG. 5. A comparison of the power production without wake steering control of FIG. 2 as compared to a steered wake of FIG. 4 is illustrated in the graphs of FIGS. 6a and 6b, respectively. Specifically, FIG. 6b illustrates that there is an increase in power production magnitude with the implementation of wake steering control as compared to FIG. 6a.

FIGS. 7a-7d illustrate example wake steering control schemes for producing more power at the downstream turbine 30 for turbines located both near and far from the upstream turbine 20. The Jenson theory of wake expansion is shown here where wind turbine wakes are known to expand slightly as the distance away increases (approximately a 10 degree angle). FIGS. 7a-7d illustrate the effect of narrowing the wake of a turbine through yaw misalignment of an embodiment of the invention. This effect should reduce the downstream influence of a turbine. As shown herein, the misaligned turbine 20 steers its wake away from the neighboring downstream turbine 30.

Figures 7A, 7B:
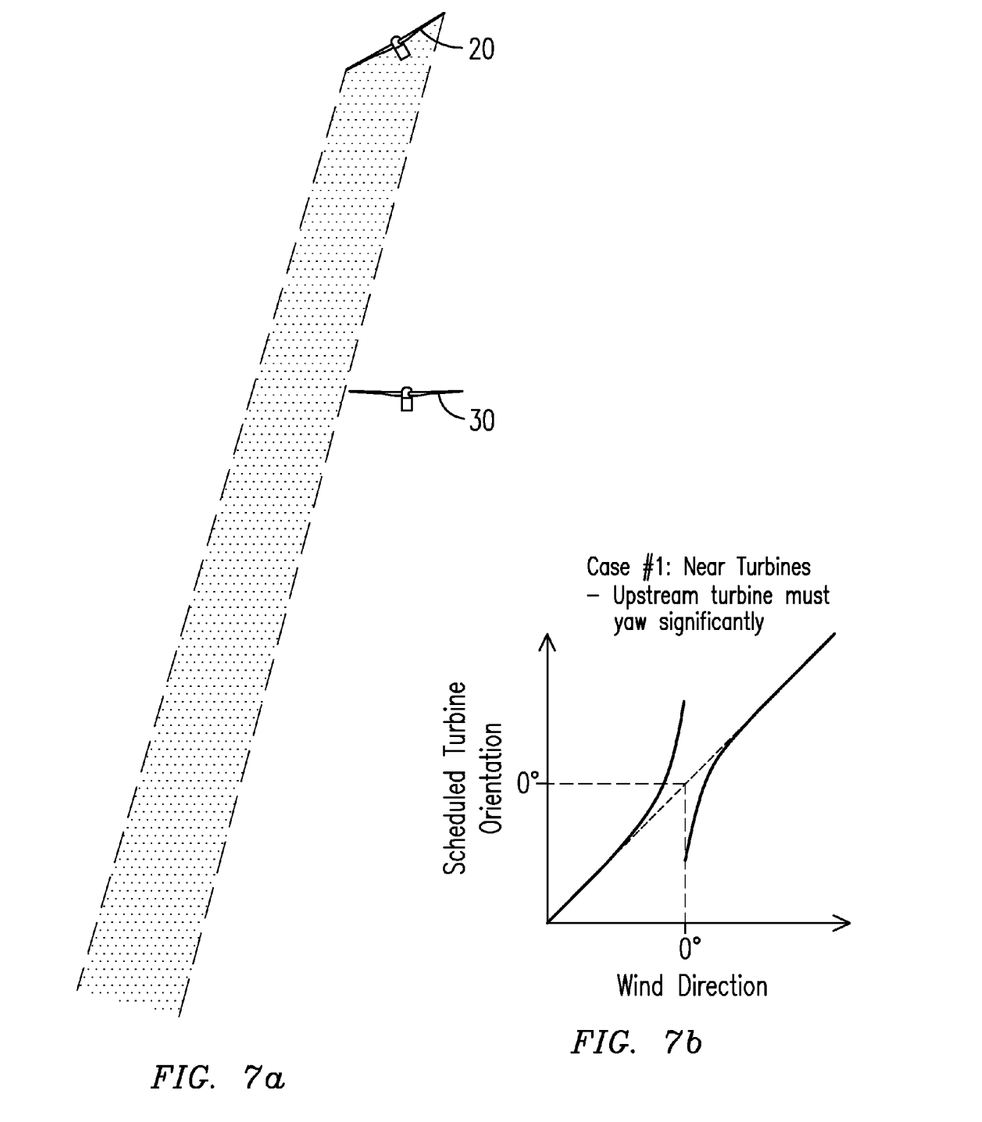
FIGS. 7a-7d illustrate wake steering control for near and far turbines.

In a case of neighboring turbines that are relatively in close proximity to each other, FIG. 7a shows an example of an amount of steering required to steer the wake away from the downstream turbine 30. A wake steering control scheme for a near turbine case is illustrated in FIG. 7b, showing a large yaw angle of the upstream turbine 20. The control scheme is illustrated as a piecewise graph to account for whether the wind direction is impinging the upstream turbine at a slight negative angle or positive angle. In this example, if the wind direction is impinging the upstream turbine at a slight negative angle, the turbine will yaw itself at a positive angle in order to properly deflect the wake. Whereas, if the wind impinges at a slight positive angle, the turbine will yaw in the negative direction. The angle of the wind direction is shown on the x-axis and the amount of yaw to effect a desired steering (scheduled turbine orientation) is shown on the y-axis. As shown herein, the graph illustrates a range of wind directions to either side of 0° (direct impingement) that accomplish wake steering control where the turbine is misaligned with the wind (herein where the graph appears curvilinear). Outside of this range, no wake steering control is applied and the turbine is aligned with the wind (herein where the graph appears linear).

Figure 7C:
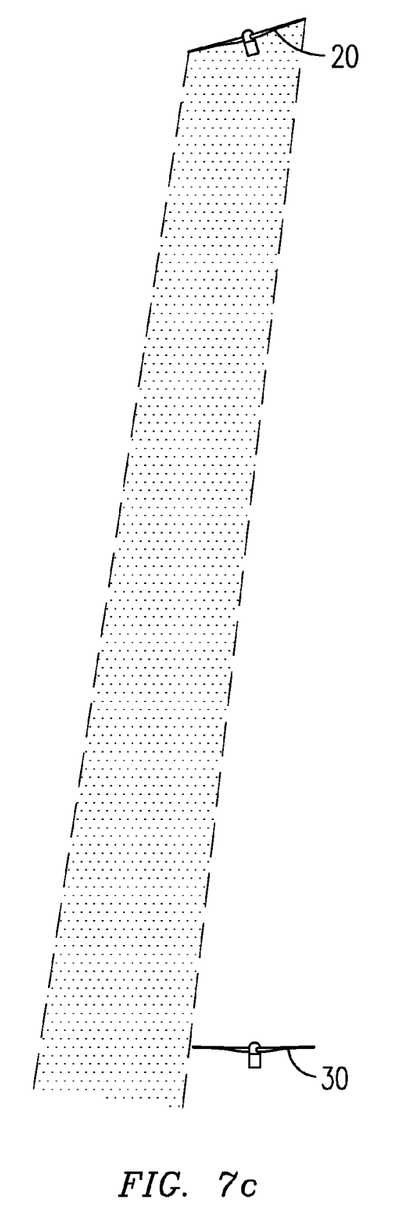
Figure 7D:
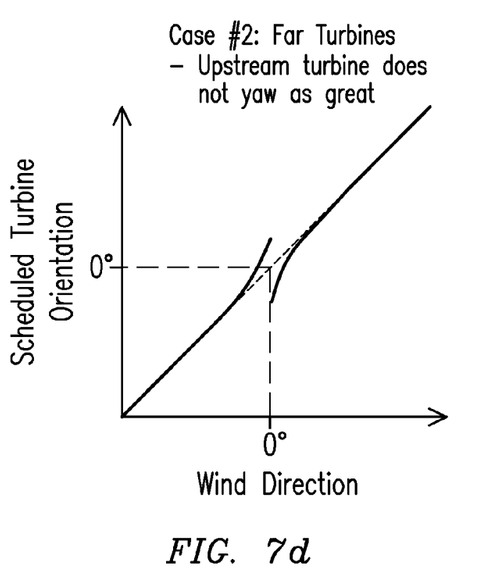

Similarly, in a case of neighboring turbines that are further apart from each other, FIG. 7c shows an example of an amount of steering required to steer the wake away from the downstream turbine 30. A wake steering control scheme for a far turbine case is illustrated in FIG. 7d, showing a smaller yaw angle of the upstream turbine 20. Directly comparing the two cases, it can be seen that if the downstream turbine 30 is in close proximity to the upstream turbine 20, the upstream turbine 20 will require more yawing to steer the wake, than when the downstream turbine 30 is further away.

The range of wind directions and extent of wake control depends on the spatial arrangement (proximity, angle, and placement) of the turbines. The determination of a particular control scheme would optimally balance between steering too much (negative effects on the upstream turbine) and not steering enough (lost power downstream).

Figure 8:
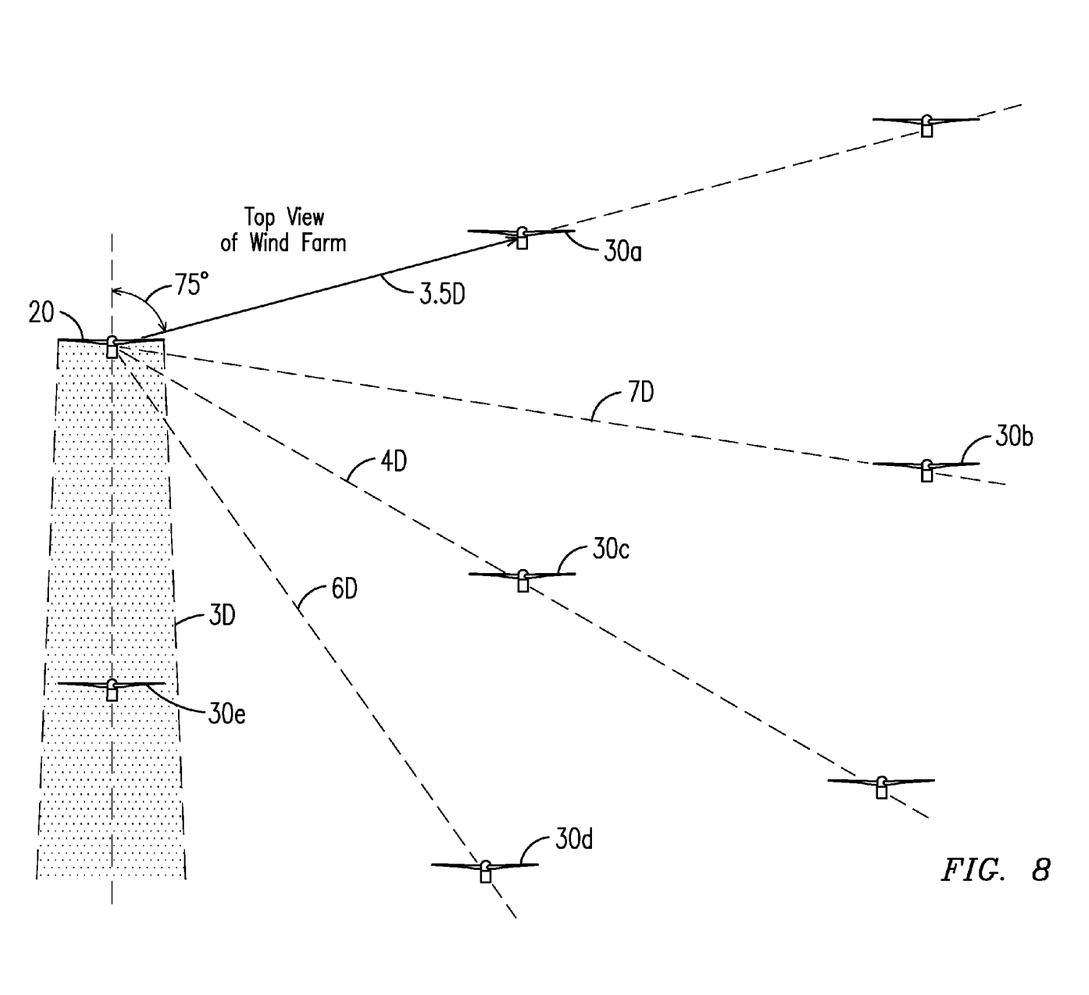
FIG. 8 is a schematic drawing illustrating a wind farm arrangement.

FIG. 8 shows an example arrangement of wind turbines on a farm with a plurality of turbines (30a, 30b, 30c, 30d, 30e) being located at different distances away (rotor diameters D) and angles from a turbine 20 of interest. In this example, the turbine 20 of interest has five turbines in its vicinity arranged in a lattice pattern, located at 3.5D @75°, 7D @98°, 4D @120°, 6D @145°, and 3D @180°, respectively.

Figure 9:
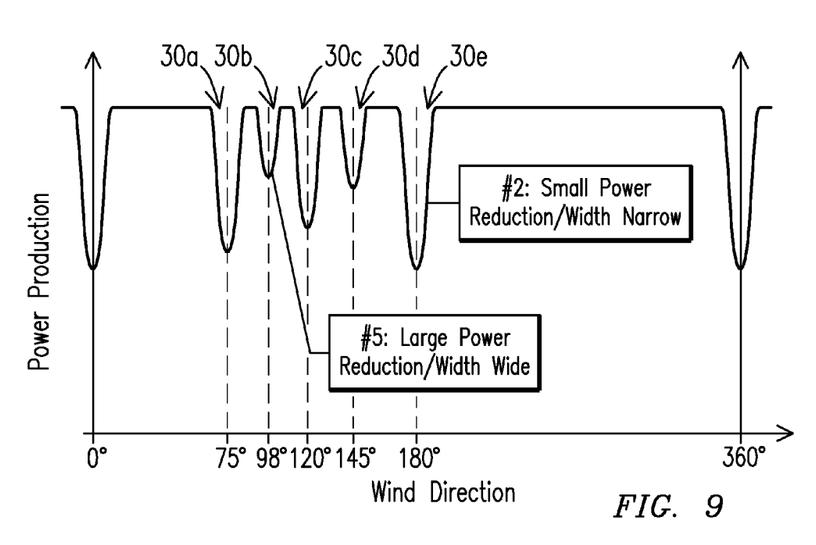
FIG. 9 illustrates a power production graph for the wind farm arrangement of FIG. 8 without wake steering control.

When the wind is impinging at all angles (perhaps over the course of a month), FIG. 9 shows and example power production of the turbine 20 of interest based on wind directions without any wake steering control.

Figure 10:
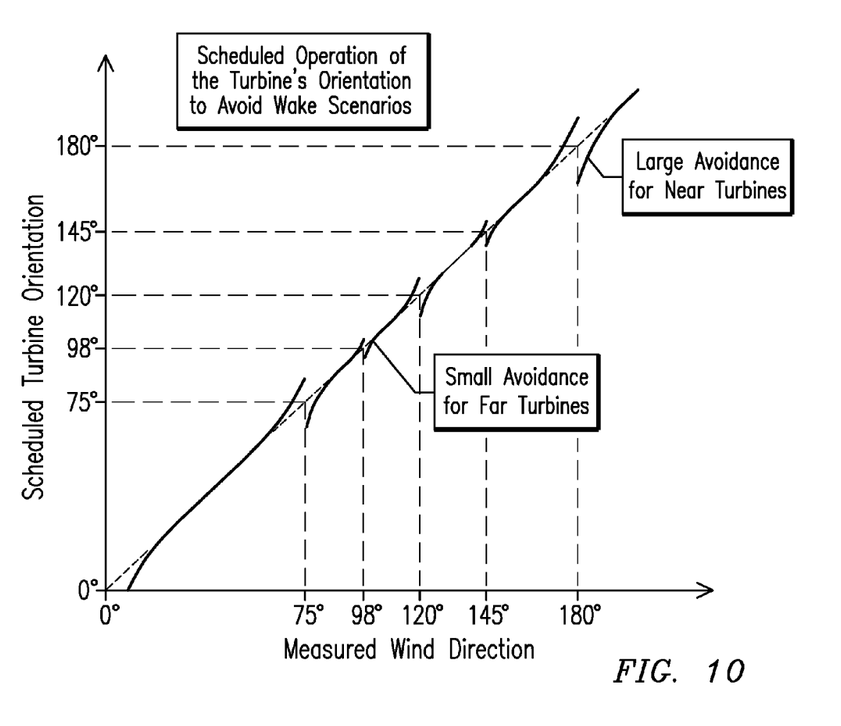
FIG. 10 illustrates an example control scheme for the wind farm arrangement of FIG. 8.

FIG. 10 illustrates a wake steering control scheme for yawing turbine 20 in order to produce more power by the wind farm as a whole. This graphically represented control scheme shows a greater steering for the close turbines and less steering for turbines located farther away. The angular misalignment for the wake steering control scheme may be functionally represented by an array of functions, for example, taking into account spatial arrangement (both wind direction/angle and proximity). In this manner, for a given wind direction, the wake steering control scheme implements a predetermined yaw control according to the correct function in the array. As known in the art, the operation of the wake steering control scheme may be defined, for example, by a formula, algorithm, table, or a graph of the function.

Figure 11:
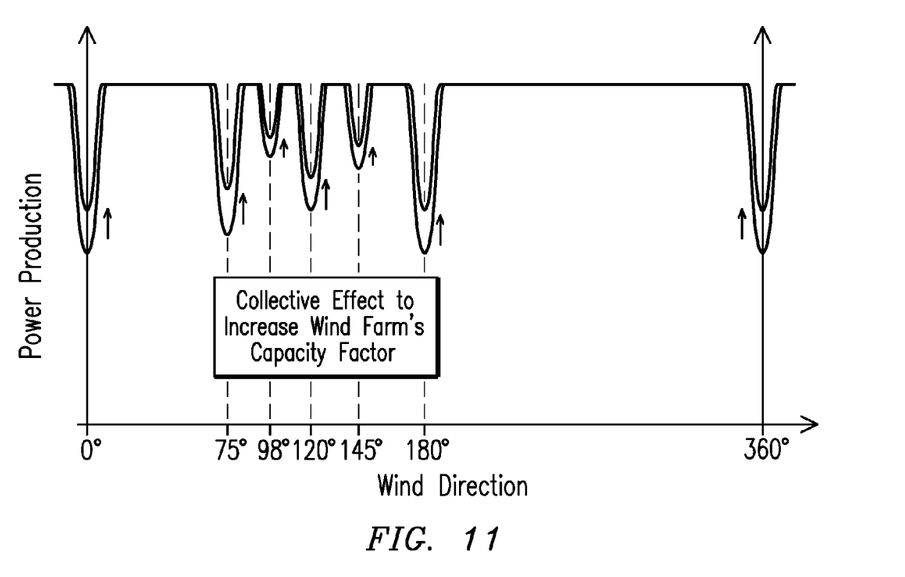
FIG. 11 illustrates a power production graph for the wind farm arrangement of FIG. 8 with wake steering control.

The results of implementing a wake steering control scheme for other turbines that have an effect on turbine 20 is shown in the power production graph of FIG. 11 which shows that, as a result of this scheme, more power is produced. If implemented across the wind farm, each downwind turbine not only produces more power, but the influencing region (in angle) may be reduced as well. A further advantage of this scheme is that a turbine that yaws out of the wind direction can lower fatigue loads if wind shear is present in the atmosphere (as yawing reduces cyclic thrust loading to some degree).

To implement a wake steering control scheme for yawing turbines of a wind farm, the wind farm layout is used in order to determine the spatial arrangement, i.e., the distance (e.g., distance in rotor diameters D) and various angles (α) between the turbines on the farm. The layout information may be stored on a non-transitory computer readable medium in communication with a controller/processor for implementing the control. With this layout information, a particular wake steering control scheme can be designed for the farm that takes into account impinging wind direction, and the spatial arrangement of the turbines (e.g., the angles and distance D). An optimal control scheme may include factors such as when to begin control (range of wind direction angles to activate control such as +/−20, +/−15, or +/−10 degrees off parallel), the direction of steering (e.g., positive impingement=negative yaw/negative impingement=positive yaw), the amount of steering/yaw (e.g., greater for close turbines and less for far turbines), and any thresholds to implement.

The control scheme can be predetermined based on the layout and stored for use in operation of the wind farm. The control scheme can be updated as needed to implement an optimal scheme or when changes are made to the wind farm, such as adding or removing a turbine, or other factors that may affect power production. The control scheme may be modeled using computer simulation or computer modeling, based on past data or current data. Moreover, the power production of the wind farm can be monitored during operation and the control scheme can be optimally adjusted over time. For example, a learning algorithm or neural network or other information or signal processing system can monitor the power production during operation and learn the optimal controller settings to be implemented in the scheme. Other known methods of optimization may be used to determine the best controller settings for this scheme.

Figure 13:
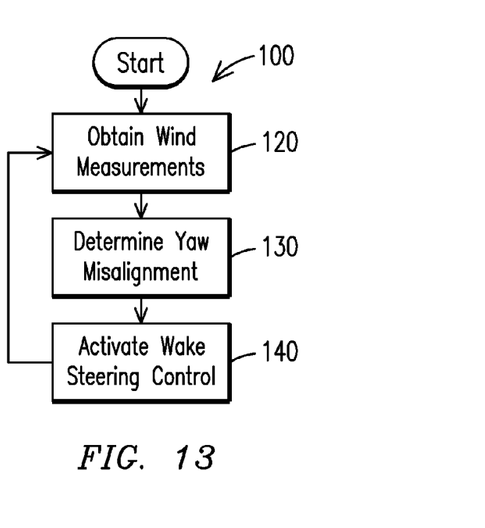
FIG. 13 is a flowchart of an embodiment of the invention.

The method of operation 100 is shown in FIG. 13. First, wind measurements are obtained, 120 (e.g., wind impingement angle) and used as an input to the system to implement the yaw misalignment. Typical direct wind measurement instruments include, for example, anemometers, wind vanes, thermometers, and barometers. A wind vane may be used to measure wind impingement angle, for example. These wind measurement instruments are mounted on the turbine typically at hub height or on one or more meteorological masts located nearby. Wind measurement instruments are generally part of larger measurement systems that further include, for example, transducers, signal conditioners, recorders, and/or communication devices. The instruments typically measure signals at a predetermined sampling rate which can be a function of the data recording and collection system. Typical data recording and collection systems include data loggers or data acquisition using computers. Data produced by the data recording and collection system is analyzed to provide a number of useful results for the operation of the wind farm.

This measured wind direction is used to determine yaw misalignment, 130, based on the layout of the farm and the spatial arrangement of the turbines. The measured wind direction will determine whether the yaw will be positive or negative. It will also determine when to begin to activate yaw misalignment control. For wind directions outside a predetermined range, no wake steering control would be implemented and the turbine will remain aligned with the wind. For wind directions within a predetermined range, the wake steering control scheme to misalign the turbine may be activated. A delay may be programmed into the system to avoid implementing changes to yaw misalignment based on intermittent wind shifts and other factors to provide for smooth operation. A defined maximum limit and/or the defined minimum limit according to a wind direction, wind speed, and/or a rotational speed of a rotor of the wind turbine may also be integrated into the scheme.

The amount of misalignment may be implemented as a function of impinging wind direction and the spatial arrangement of the turbines (distance and angle). The control scheme can apply a greater yaw misalignment angle and/or activate for a larger range of impingement wind directions when effecting the misalignment. Similarly, the control scheme can apply less of a yaw misalignment angle and/or activate for a smaller range of impingement wind directions when effecting the misalignment. The amount of misalignment may be limited by a threshold for safety or for other functional or operational reasons.

The implementation of the control scheme may be in the form of one or more control functions executed by a processor or controller in communication with the turbine and capable of effecting yaw control. For example, an array of functions may be provided that provide proportionally small avoidance for far turbines and large avoidance for near turbines. The amount of misalignment may be represented as a linear, exponential, or power function, for example, with appropriate functional shifting, shaping, and reflecting the function to implement the desired misalignment.

The wake steering control for the wind turbine is activated 140 by producing a control signal adapted to implement the misalignment of the wind turbine with the wind direction. The yaw misalignment is implemented for the turbine by sending a control signal to yaw the turbine by the yaw amount determined by the control scheme.

Continuous or periodic monitoring of the wind impingement angle can be used for the wake steering control and the yaw misalignment can be systematically updated (continuously or periodically) as the wind direction changes. Once the wind direction impinging on an upstream turbine changes to a direction that no longer affects downstream turbines, or is no longer in the range predetermined for implementing control, the wake steering control can be halted and the turbine can be returned to normal operational alignment.

Figure 12:
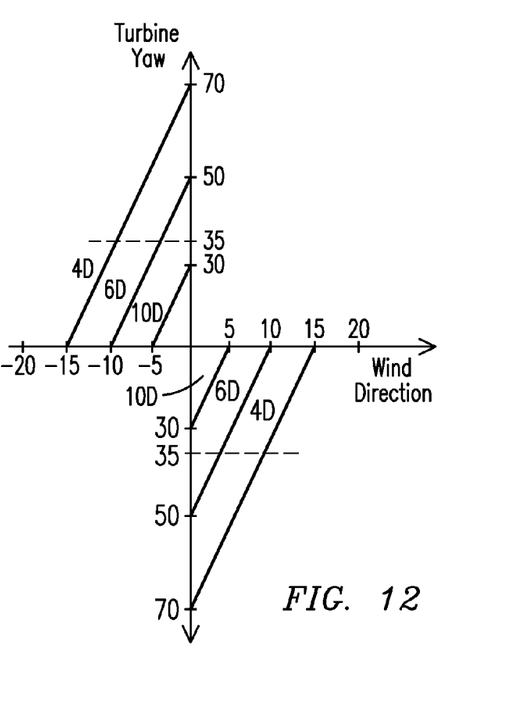
FIG. 12 illustrates example misalignment schemes for three scenarios.

FIG. 12 shows an example control scheme for three scenarios (4D, 6D, and 10D—where D refers to to the distance between the yawing turbine and the turbine that is avoiding wake in units of diameters (D). In this figure, the X-Axis represents Wind Direction (degrees) and the Y-Axis represents Turbine Yaw (degrees). For the nearest-turbine separation (4D), in this example, the yawing turbine wake steering control "activates" when the wind direction is +/−15 degrees off parallel. When the wind direction is coincident with the turbines (0 degrees WD), the control scheme will yaw the turbine 70 degrees. Between 0 and 15 degrees, the yaw direction is linear with wind direction, as shown. In this example, the degree to which the yawing turbine will yaw in order to avoid the downwind turbine is less for the 6D and 10D cases, as shown, yawing to 50 degrees and 30 degrees, respectively.

Since a turbine that yaws 70 degrees to the incoming wind direction may not produce sufficient power, a less aggressive steering amount may be implemented. The dashed line in the figure represents a threshold so that the turbine does not yaw more than 35 degrees (or so) to avoid a wake scenario. A positive wind-direction side mirrors the negative side for the control scheme.

The above scenario is designed for full wake avoidance. Therefore, it can be considered an extreme example. In many cases, less wake steering (<100% avoidance) would suffice where the turbine operation is below rated power. Once the turbine hits rated power, the amount of steering the turbine can do by yawing becomes significantly worse, almost non-existent. In this example, the lines in the figure would be steeper and would limit the steering ability greatly.

Based on the foregoing specification, the invention may be implemented on a computer or computing/processing device using computer programming or engineering techniques including computer software, firmware, hardware or any combination or subset thereof. Any such resulting program, having computer-readable code thereon, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc.

One skilled in the art of computer science will easily be able to combine the program code created as described with appropriate general purpose or special purpose computer hardware to create a computer system or computer subsystem embodying the method of the invention. An apparatus for making, using or selling the invention may be one or more processing systems including, but not limited to, sensors, a central processing unit (CPU), memory, storage devices, communication links and devices, servers, I/O devices, or any sub-components of one or more processing systems, including software, firmware, hardware or any combination or subset thereof, which embody the invention. User input may be received from a keyboard, mouse, pen, voice, touch screen, or any other means by which a human can input data into a computer, including through other programs such as application programs. Data input may be received from any of a number of sensors or data input devices in communication therewith, wired or wirelessly. Output may comprise a computer monitor, television, LCD, LED, or any other means to convey information to the user. Output may further comprise data adapted to control external devices, such as a wind turbine, in communication therewith, wired or wirelessly.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method implemented on a wind farm having a plurality of spatially distributed wind turbines for improving power production efficiency, comprising:

storing data indicative of a layout of the wind farm, the layout comprising spatial relationships of the plurality of spatially distributed wind turbines of the wind farm including a first wind turbine of the wind farm and a neighboring wind turbine of the wind farm;

receiving a wind measurement comprising a wind direction impinging on the first wind turbine of the wind farm;

determining by a processor a misalignment of the first wind turbine with respect to the wind direction, wherein the misalignment is adapted to steer a wake of the first wind turbine away from the neighboring wind turbine of the wind farm, wherein the determining by the processor of the misalignment of the first wind turbine with respect to the wind direction is configured to provide a variable degree of avoidance by the neighboring wind turbine of the wake of the first wind turbine based on the stored spatial relationships of the first wind turbine relative to the neighboring wind turbine, wherein the processor determines a deflection angle of the wake based on $\phi=0.6a\theta$, where "a" is the axial induction factor and $\theta$ is a degree of the misalignment of the first wind turbine relative to the wind direction impinging on the first wind turbine; and activating a wake steering control for the first wind turbine by producing a control signal adapted to implement the misalignment of the first wind turbine with the wind direction, wherein the wake steering control is adapted to produce a control signal that directs the first wind turbine to yaw in a positive direction when the wind direction is impinging at a negative angle, and to yaw in a negative direction when the wind direction is impinging at a positive angle, wherein the yaw angle in the positive direction comprises an angle of approximately +70° when the neighboring wind turbine is located at a distance of approximately 4D downstream from the first turbine and the wind direction is impinging on the first wind turbine an angle of approximately 0°, where D represent units of diameter, wherein when the yaw angle in the positive direction is approximately +70°, the wake of the first wind turbine fully avoids the neighboring wind turbine, wherein the yaw angle in the negative direction comprises an angle of approximately −70° when the neighboring wind turbine is located at the distance of approximately 4D downstream from the first turbine and the wind direction is impinging on the first wind turbine at a an angle of approximately 0°, wherein when the yaw angle in the negative direction is approximately −70°, the wake of the first wind turbine fully avoids the neighboring wind turbine.

2. The method of claim 1 wherein determining the misalignment of the first wind turbine comprises determining based on the wind direction whether the wake of the first wind turbine impinges on the neighboring wind turbine.

3. The method of claim 1 wherein determining the misalignment of the first wind turbine comprises determining based on the wind direction an amount of the wake of the first wind turbine that impinges on the neighboring wind turbine.

4. The method of claim 1 wherein an amount of the misalignment of the first wind turbine with respect to the wind direction is dependent on an angle and a distance between the first wind turbine and the neighboring wind turbine.

5. The method of claim 1 wherein an amount of the misalignment of the first wind turbine with respect to the wind direction determined is inversely proportional to a proximal distance between the first wind turbine and the neighboring wind turbine.

6. The method of claim 1 further comprising realigning the first wind turbine with respect to the wind direction when the wind direction is outside a predetermined range of angles for the wind direction impinging on the first wind turbine.

7. The method of claim 1 further comprising implementing the misalignment by rotating a nacelle of the first wind turbine leading to the misalignment of the first wind turbine with the wind direction, thereby narrowing an influence of the wake on the neighboring wind turbine geometrically.

8. The method of claim 1, further comprising the processor monitoring a combined power production of the first wind turbine and the neighboring wind turbine, executing a control function that determines the misalignment that maximizes the combined power production, and executing a learning algorithm that optimizes the control function to further increase the combined power production over time.

9. The method of claim 8, wherein the control function provides a first yaw adjustment curve for a range of negative incoming wind directions relative to a line between the first wind turbine and the neighboring wind turbine, a second yaw adjustment curve for a range of positive incoming wind directions relative to said line, and the first and second yaw adjustment curves are discontinuous with each other only for an incoming wind direction aligned with said line.

10. The method of claim 1, further comprising the processor determining the misalignment by executing a control function selected from an array of control functions based on a distance between the first wind turbine and the neighboring wind turbine, and the processor monitors a combined power production of the first wind turbine and the neighboring wind turbine and executes a learning algorithm that adjusts the control functions in the array based on the combined power resulting therefrom to further increase the combined power production over time.

11. The method of claim 1, wherein the processor determines the misalignment to produce a maximum combined power production of the first wind turbine and the neighboring wind turbine based on a distance there between, the wind direction relative to a line there between, and at least one of: a) a horizontal narrowing of the wake resulting from the misalignment, and b) the deflection angle of the wake resulting from the misalignment.

12. A system for improving power production efficiency on a wind farm having a plurality of spatially distributed wind turbines, comprising:
  a data storage device for storing data indicative of a layout of the wind farm, the layout comprising spatial relationships of the plurality of spatially distributed wind turbines of the wind farm including a first wind turbine of the wind farm and a neighboring wind turbine of the wind farm;
  a data processing device for receiving a wind measurement comprising a wind direction impinging on a first wind turbine of the wind farm; determining a misalignment of the first wind turbine with respect to the wind direction, wherein the misalignment is adapted to steer a wake of the first wind turbine away from a neighboring wind turbine of the wind farm, wherein the determining by the data processing device of the misalignment of the first wind turbine with respect to the wind direction is configured to provide a variable degree of avoidance by the neighboring wind turbine of the wake of the first wind turbine based on the stored spatial relationships of the first wind turbine relative to the neighboring wind turbine, wherein the data processing device further determines a deflection angle of the wake resulting from the misalignment, wherein the processor determines the deflection angle of the wake based on an axial induction factor of the first wind turbine and an amount of the misalignment; and
  activating a wake steering control for the first wind turbine by producing a control signal adapted to implement the misalignment of the first wind turbine with the wind direction,
  wherein the wake steering control is adapted to produce a control signal that directs the first wind turbine to yaw in a positive direction when the wind direction is impinging on the first wind turbine at a negative angle and to yaw in a negative direction when the wind direction is impinging at a positive angle,
  wherein the yaw angle in the positive direction comprises an angle of approximately +70° when the neighboring wind turbine is located at a distance of approximately 4D downstream from the first turbine and the wind direction is impinging on the first wind turbine at an angle of approximately 0°, where D represent units of diameter, wherein when the yaw angle in the positive direction is approximately +70°, the wake of the first wind turbine fully avoids the neighboring wind turbine, and
  wherein the yaw angle in the negative direction comprises an angle of approximately −70° when the neighboring wind turbine is located at the distance of approximately 4D downstream from the first turbine and the wind direction is impinging an angle of approximately 0°, wherein when the yaw angle in the negative direction is approximately −70°, the wake of the first wind turbine fully avoids the neighboring wind turbine.

13. The system of claim 12, the misalignment comprising a smaller yaw angle for greater proximal distances between the first wind turbine and the neighboring wind turbine.

14. The system of claim 12 further comprising a yaw controller connected to a yaw drive that receives the control signal and misaligns the first wind turbine with the wind direction based on the control signal when the wind direction impinging on the first wind turbine is within a predetermined range of angles and realigns the first wind turbine with respect to the wind direction when the wind direction is outside the predetermined range of angles.

15. The system of claim 12, wherein the processor determines the misalignment to produce a maximum combined power production of the first wind turbine and the neighboring wind turbine based on a distance there between, the wind direction relative to a line there between, and at least one of: a) a horizontal narrowing of the wake resulting from the misalignment, and b) the deflection angle of the wake resulting from the misalignment.

16. A non-transitory computer readable medium containing instructions that when executed by a processor perform acts comprising:
  reading a layout of the wind farm stored in a data storage device, the layout comprising spatial relationships of the plurality of spatially distributed wind turbines of the wind farm including a first wind turbine of the wind farm and a neighboring wind turbine of the wind farm;
  receiving a wind measurement comprising a wind direction impinging on the first wind turbine;
  determining a misalignment of the first wind turbine with respect to the wind direction, wherein the misalignment is adapted to steer a wake of the wind turbine away from the neighboring wind turbine, wherein the determining of the misalignment of the first wind turbine with respect to the wind direction is configured to provide a selectable degree of avoidance of the wake of the first wind turbine by the neighboring wind turbine based on the read spatial relationships of the first wind turbine relative to the neighboring wind turbine; and
  activating a wake steering control for the first wind turbine by producing a control signal adapted to implement the misalignment of the first wind turbine with the wind direction;
  wherein the processor determines the misalignment to produce a maximum combined power production of the first wind turbine and the neighboring wind turbine based on a distance there between, the wind direction relative to a line there between, an incoming wind speed, and at least one of a) a horizontal narrowing of a cross section of the wake resulting from the misalignment, and b) a deflection angle of the wake resulting from the misalignment, wherein the processor determines the deflection angle based on an axial induction factor of the wind turbine and a degree of the misalignment,
  wherein the wake steering control is adapted to produce a control signal that directs the first wind turbine to yaw in a positive direction when the wind direction is impinging on the first wind turbine at a negative angle and to yaw in a negative direction when the wind direction is impinging at a positive angle,
  wherein the yaw angle in the positive direction comprises an angle of approximately +70° when a neighboring wind turbine is located at a distance of approximately 4D downstream from the first turbine when the wind direction is impinging on the first wind turbine at an angle of approximately 0°, where D represent units of diameter, wherein when the yaw angle in the positive direction is approximately +70°, the wake of the first wind turbine fully avoids the neighboring wind turbine, and wherein the yaw angle in the negative direction comprises an angle of approximately −70° when the neighboring wind turbine is located at the distance of approximately 4D downstream from the first turbine and the wind direction is impinging at an angle of approximately 0°, wherein when the yaw angle in the negative direction is approximately −70°, the wake of the first wind turbine fully avoids the neighboring wind turbine.

\* \* \* \* \*